United States Patent [19]

Saito et al.

[11] Patent Number: 4,699,944

[45] Date of Patent: Oct. 13, 1987

[54] POLYETHERKETONE RESIN COMPOSITION

[75] Inventors: Teruo Saito, Kusatsu; Kazuo Hieda, Nishinomiya, both of Japan

[73] Assignee: Sumitomo Chemical Company, Limited, Osaka, Japan

[21] Appl. No.: 866,499

[22] Filed: May 23, 1986

[30] Foreign Application Priority Data

May 29, 1985 [JP] Japan .............................. 60-116098

[51] Int. Cl.[4] .................................................. C08K 7/08
[52] U.S. Cl. .................................... 524/413; 524/599; 524/611
[58] Field of Search ......................................... 524/413

[56] References Cited

U.S. PATENT DOCUMENTS

| | | | |
|---|---|---|---|
| 3,129,105 | 4/1964 | Berry et al. | 524/413 |
| 4,626,564 | 12/1986 | Saito et al. | 524/609 |

FOREIGN PATENT DOCUMENTS

| | | | |
|---|---|---|---|
| 59-157150 | 9/1984 | Japan | 524/413 |
| 59-189164 | 10/1984 | Japan | 524/413 |
| 59-182842 | 10/1984 | Japan | 524/413 |
| 59-182853 | 12/1984 | Japan | 524/413 |
| 60-258251 | 12/1985 | Japan | 524/413 |

*Primary Examiner*—Lewis T. Jacobs
*Attorney, Agent, or Firm*—Stevens, Davis, Miller & Mosher

[57] ABSTRACT

A polyetherketone resin composition improved in heat stability when melted, which comprises 30 to 95% by weight of polyetherketone and 70 to 5% by weight of potassium titanate fibers which do not contain more than 0.25% by weight of free potassium.

17 Claims, No Drawings

POLYETHERKETONE RESIN COMPOSITION

FIELD OF THE INVENTION

The present invention relates to a resin composition comprising polyetherketone and potassium titanate fibers.

BACKGROUND OF THE INVENTION

Polyetherketone is noticed as an engineering plastic superior in heat resistance, strength, stiffness, flame retardance, chemical resistance, etc., particularly in respect to its uses for electrical parts, automobile parts, and the like.

In these application fields, there is a further need for this sort of material having higher heat resistance, strength, and stiffness while retaining the good flame retardance, chemical resistance, hot water resistance, processability, etc. which are characteristic of polyetherketone.

It is known that polyetherketone is fairly improved in strength, stiffness, heat resistance, and other properties by incorporating thereinto a fibrous reinforcing material such as glass fiber, carbon fiber or the like. However, compositions loaded with fibrous reinforcing material have drawbacks such that they exhibit high anisotropy, coarse surfaces, and inferior appearance and abrade processing machines and molds. By incorporating a powdery or flaky filler such as a calcium carbonate, mica, or glass bead filler into polyetherketone, this polymer can be improved in dimensional stability but insufficiently in stiffness. In addition, such filler incorporation lowers the impact strength, making the polymer brittle.

To overcome these drawbacks, there have been proposed resin compositions comprising polyetherketone and potassium titanate fibers.

However, these compositions have a drawback in that the melt viscosity and molding instability in melt molding (e.g. injection molding) increase on account of the stagnation of melt at elevated temperatures as the load of potassium titanate fibers is increased to achieve greater reinforcing effect.

SUMMARY OF THE INVENTION

It is an object of the present invention to provide a resin composition improved in heat stability when melted, which comprises polyetherketone and potassium titanate fibers.

Thus the present invention relates to a polyetherketone resin composition comprising 30 to 95% by weight of polyetherketone and 70 to 5% by weight of potassium titanate fibers which do not contain more than 0.25% by weight of free potassium.

DETAILED DESCRIPTION OF THE INVENTION

The polyetherketone used in the present invention comprises repeating units of the formula,

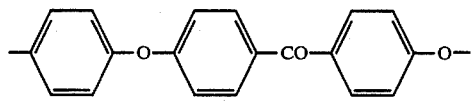

alone or in combination with repeating units of an other type. The repeating units of another type, e.g.

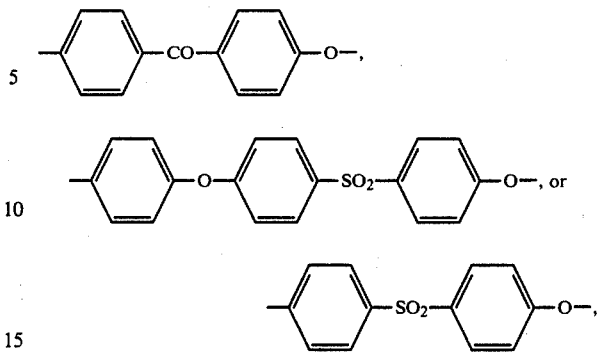

may be contained in amounts less than 25% by weight. Polyetherketone containing 25% by weight or more of such other type repeating units is undesirable since the abovecited characteristics of polyetherketone are lost in this case.

The intrinsic viscosity of the present polyetherketone is desirably from 0.3 to 2.6, further preferably from 0.5 to 1.8. Any polyetherketone with an intrinsic viscosity below 0.3 has a low heat resistance and is fragile, because of its low molecular weight, and satisfactory strength cannot be obtained by incorporating the above stated type of potassium titanate fiber into such polyetherketone. When the intrinsic viscosity exceeds 2.6, the melt viscosity is too high and hence the flow in melt molding is insufficient to provide good molded articles. Thus polyetherketone having an intrinsic viscosity of 0.3 to 2.6 is desirable in that it offers good surface appearance and superior physical properties and processability. Such polyetherketone can be produced according to processes as disclosed in Japanese Patent application Laid-Open No. 90296/79 and other documents.

Herein the intrinsic viscosity is measured at 25° C. on a solution of the polymer sample in conc. sulfuric acid of 1.84 g/cm$^3$ density at a concentration of 0.1 g polymer per 100 cm$^3$ solution. The measurement of intrinsic viscosity was conducted by using viscometers which give a solvent effluence time of about 2 minutes. This intrinsic viscosity depends solely upon the molecular weight of the polymer.

The potassium titanate fiber used in the present invention is kind of high tenacity single-crystalline fiber (whisker) consisting of acicular crystals having fundamentally a chemical composition of $K_2O \cdot 6TiO_2$ or $K_2O \cdot 6TiO_2 \cdot \frac{1}{2}H_2O$. Typical melting points of the crystals are from 1300° to 1350° C. The fibers have desirably an average length of 5 to 150 μm and an average diameter of 0.05 to 2.0 μm, preferably an average length of 10 to 30 μm and an average diameter of 0.1 to 0.5 μm.

Suitable compounding proportions of the polyetherketone and of the potassium titanate fibers are from 30 to 95% by weight and from 70 to 5% by weight, respectively, based on the total weight of the two components. When the proportion of the polyetherketone exceeds 95% by weight, that is, the proportion of the potassium titanate fibers is less than 5% by weight, the improvement in heat resistance, stiffness, and dimensional stability is unsatisfactory. When the proportion of the polyetherketone is less than 30% by weight, that is, the proportion of the potassium titanate fibers exceeds 70% by weight, the dispersion of the components in melt mixers is insufficient and because of the remarkable increase in melt viscosity, the fluidity is low and the molding is difficult under usual conditions.

It is necessary that the content of free potassium in the potassium titanate fibers used in the present invention should be up to 0.25% by weight as potassium elements.

The free potassium in the potassium titanate fibers is defined as the potassium which does not exist in the form of $K_2O \cdot 6TiO_2$ or $K_2O \cdot 6TiO_2 \cdot \frac{1}{2}H_2O$ in the fibers and most of the free potassium in the fiber exist in the form of $K_2O$.

When the content of free potassium exceeds 0.25% by weight, the heat stability of the melted polyetherketone composition is deteriorated and a very large increase in viscosity will be caused by stagnation of the melt. The increase in viscosity becomes still larger and the molding becomes unstable, in particular when the melt of higher potassium titanate fiber content stagnates at higher temperature for a longer time.

The increase in melt viscosity becomes extremely small when the free potassium content in the potassium titanate fibers is up to 0.25% by weight, and said increase more scarcely occurs even under harsh conditions when the free potassium content is up to 0.20% by weight.

In the present invention, the potassium titanate fibers have the action of improving the composition in various physical properties such as heat distortion resistance, strength, stiffness, and dimensional stability. It is assumed that free potassium in the potassium titanate fibers may react on active groups, for example, terminal hydroxyl groups, of the polyetherketone melt, thereby increase the melt viscosity.

In fact the increase in melt viscosity becomes more remarkable, as the melt temperature is raised, the melt stagnation lasts longer, and the potassium titanate fiber content in the melt is increased. However, the increase in melt viscosity scarcely occurs when the free potassium content in the potassium titanate fibers is up to 0.25% by weight.

The free potassium content in said fibers is determined, for example, in the following way:

A prescribed amount of potassium titanate fibers is taken and boiled in water for many hours to elute the free potassium into the water. The eluted potassium is analyzable by any of flame spectrochemical analysis, atomic absorption analysis, and ICP emission spectrochemical analysis (high-frequency induction coupling plasma emission spectrography).

There is no particular restriction on the process for producing potassium titanate fibers in which the free potassium content is not more than 0.25% by weight.

Known processes for producing potassium titanate include the burning process, fusion process, hydrothermal process, and flux process. When the intended $K_2O \cdot nTiO_2$ is produced, the fiber length as well as n can be fixed by adjusting the mixing proportions of starting materials $K_2O$ and $TiO_2$, the reaction temperature, and the basicity of the reaction system.

The process for producing potassium titanate fibers not containing more than 0.25% by weight of free potassium can be exemplified by; the above-cited processes wherein the free $K_2O$ content, viz. free potassium, is decreased by choosing proper conditions; a process comprising burning potassium titanate fibers produced by the usual industrial process which contain 0.27 to 0.40% by weight of free potassium, at a high temperature (at least 500° C.) to decrease the free potassium content; and a process comprising extracting free $K_2O$ from such industrial potassium titanate fibers as mentioned above into water or acid to decrease the free potassium content.

There is no particular restriction on the method of compounding the polyetherketone and the potassium titanate fibers. The polyetherketone and the potassium titanate fibers can be fed successively into a melt mixer or these materials can be fed into a melt mixer after they have been premixed by using a mortar, Henschel mixer, ball mill, ribbon blender, or the like.

The present inventive composition may contain one or more conventional additives such as antioxidants, heat stabilizers, ultraviolet absdorbers, lubricants, mold releasing agents, colorants including dyes and pigments, flame retardants, flame retarding aids, and antistatic agents.

The following examples illustrate the present invention.

In the examples, the amount of free potassium is a value determined by boiling a prescribed amount of potassium titanate fibers in water for 20 hours, followed by analyzing the eluate with a spectrometer for both flame analysis and atomic absorption analysis purposes (Model 650, supplied by Shimazu Seisakusho Co., Ltd., a double-beam type, measurement wavelength 7665 Å).

The flexural elastic modulus, Izod impact strength, and heat distortion temperature are values measured in accordance with ASTM D-790, D-256, and D-648, respectively.

Heat stabilities of melted compositions were evaluated by comparing melt viscosities measured by using a Koka type of flow tester (supplied by Shimazu Seisakusho Co., Ltd.) under conditions of temperature 400° C. load 50 kg/cm², nozzle diameter 1 mm$\phi$, land length 10 mm, and residence times 5 minutes and 60 minutes.

EXAMPLES 1-3

A polyetherketone having the repeating unit

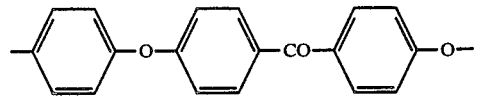

and an intrinsic viscosity of 0.8 and potassium titanate fibers containing 0.03% by weight of free potassium (HT-200, supplied by Titan Kogyo Co., Ltd., fiber diameter 0.3–1.0 μm, fiber length 20–120 μm ) were mixed in proportions as shown in Table 1, the mixture were each melt-mixed through a twin-screw extruder (PCM-30, supplied by Ikegai Corporation) at 360° C. to form strands, and the strands were cooled with water and cut into pellets.

These pellets were injection-molded (a 47/28 Sumitomo-Nestal injection molding machine, cylinder temperatures 380°- 400° C., mold temperature 160° C.) to prepare different types of specimens for bending, Izod, and heat distortion tests.

Results of physical property tests on these specimens are shown in Table 1.

All the compositions have high flexural elastic moduli, impact strength, and heat distortion resistance and exhibit superior heat stability when melted. Moreover, any of the compositions even after 40-minute residence at 400° C. in injection molding showed no significant change in injection moldability.

COMPARATIVE EXAMPLES 1-3

Experiments of Examples 1-3 were followed but using potassium titanate fibers having properties similar to those of the fibers used in Examples 1-3 but containing 0.28% by weight of free potassium. Results of the experiments are shown in Table 1.

All the compositions can be molded without any special objection in injection under conditions of short residence time and are similar in physical properties to the compositions of Examples 1-3. However, the compositions of these comparative examples have poor heat stability in the melted state, as apparent from the data of melt viscosity.

In addition, any of these compositions after 40-minute residence at 400° C. in injection molding could not be molded steadily, since the melt viscosity increased markedly and sinks (depressions at the surface of molded articles) and short shot developed.

TABLE 1

|  | Proportion of charged material (wt. %) | | Mechanical property | | Thermal property Heat distortion | Melt viscosity (poise) | |
| --- | --- | --- | --- | --- | --- | --- | --- |
|  | Polyether-ketone | Potassium titanate fiber | Flexural elastic modulus (kg/cm$^2$) | Izod impact strength, notchless (kg · cm/cm) | temperature, 18.6 kg/cm$^2$ (°C.) | Residence time 5 min. | Residence time 60 min. |
| Example 1 | 40 | 60 | 121,000 | 50 | >280 | 9600 | 9800 |
| Example 2 | 70 | 30 | 102,000 | 75 | >280 | 7500 | 7600 |
| Example 3 | 90 | 10 | 63,000 | 95 | 209 | 5300 | 5300 |
| Comparative Example 1 | 40 | 60 | 124,000 | 45 | >280 | 9800 | 21000 |
| Comparative Example 2 | 70 | 30 | 101,000 | 70 | >280 | 7600 | 16500 |
| Comparative Example 3 | 90 | 10 | 65,000 | 90 | 210 | 5200 | 9100 |

What is claimed is:

1. A polyetherketone resin composition comprising 30 to 95% by weight of polyetherketone having an intrinsic viscosity of 0.3-2.6 and 70 to 5% by weight of potassium titanate fibers which do not contain more than 0.25% by weight of free potassium existing mostly in the form of K$_2$O.

2. A polyetherketone resin composition according to claim 1, wherein the potassium titanate fibers contain not more than 0.20% by weight of free potassium existing mostly in the form of K$_2$O.

3. A polyetherketone resin composition according to claim 1, wherein the polyetherketone is a copolymer.

4. A polyetherketone resin composition according to claim 2, wherein the polyetherketone is a copolymer.

5. A polyetherketone resin composition according to claim 1, wherein the polyetherketone has an intrinsic viscosity of 0.5 to 1.8.

6. A polyetherketone resin composition according to claim 2, wherein the polyetherketone has an intrinsic viscosity of 0.5 to 1.8.

7. A polyetherketone resin composition according to claim 3, wherein the polyetherketone has an intrinsic viscosity of 0.5 to 1.8.

8. A polyetherketone resin composition according to claim 4, wherein the polyetherketone has an intrinsic viscosity of 0.5 to 1.8.

9. A polyetherketone resin composition according to claim 1, wherein the potassium titanate fibers have an average length of 10 to 30 μm and an average diameter of 0.1 to 0.5 μm.

10. A polyetherketone resin composition according to claim 2, wherein the potassium titanate fibers have an average length of 10 to 30 μm and an average diameter of 0.1 to 0.5 μm.

11. A polyetherketone resin composition according to claim 3, wherein the potassium titanate fibers have an average length of 10 to 30 μm and an average diameter of 0.1 to 0.5 μm.

12. A polyetherketone resin composition according to claim 4, wherein the potassium titanate fibers have an average length of 10 to 30 μm and an average diameter of 0.1 to 0.5 μm.

13. A polyetherketone resin composition according to claim 5, wherein the potassium titanate fibers have an average length of 10 to 30 μm and an average diameter of 0.1 to 0.5 μm.

14. A polyetherketone resin composition according to claim 6, wherein the potassium titanate fibers have an average length of 10 to 30 μm and an average diameter of 0.1 to 0.5 μm.

15. A polyetherketone resin composition according to claim 7, wherein the potassium titanate fibers have an average length of 10 to 30 μm and an average diameter of 0.1 to 0.5 μm.

16. A polyetherketone resin composition according to claim 8, wherein the potassium titanate fibers have an average length of 10 to 30 μm and an average diameter of 0.1 to 0.5 μm.

17. A polyetherketone resin composition according to claim 1, molded into a desired shape.

* * * * *